United States Patent [19]
Steingroever

[11] 3,761,804
[45] Sept. 25, 1973

[54] LOW SATURATION POLE PIECE FOR A MAGNETIC THICKNESS GAUGE

[75] Inventor: Erich Steingroever, Bonn, Germany

[73] Assignee: Elektro-Physik, Hans Nix & Dr.-Ing. E. Steingroever KG., Cologne (Niehl), Germany

[22] Filed: Feb. 14, 1972

[21] Appl. No.: 225,731

[30] Foreign Application Priority Data
Feb. 15, 1971 Germany................... P 21 07 076.8

[52] U.S. Cl............................. 324/34 TK, 335/302
[51] Int. Cl............................................ G01r 33/00
[58] Field of Search...................... 324/34 R, 34 TK; 335/302, 304, 296, 297; 336/212, 233

[56] References Cited
UNITED STATES PATENTS
| | | | |
|---|---|---|---|
| 2,221,516 | 11/1940 | Hathaway | 324/34 TK |
| 2,300,336 | 10/1942 | Bozorth et al. | 324/34 R |
| 3,440,527 | 4/1969 | Steingrover | 324/34 TK |

FOREIGN PATENTS OR APPLICATIONS
| | | | |
|---|---|---|---|
| 1,001,081 | 8/1965 | Great Britain | 324/34 TK |

Primary Examiner—Robert J. Corcoran
Attorney—Arnold B. Christen et al.

[57] ABSTRACT

A pole piece for magnetic thickness gauges is composed principally of a ferromagnetic material having magnetic saturation of less than 14,000 Gauss in order to increase the linearity of the scale readings when the gauge is measuring a very thin layer.

26 Claims, 4 Drawing Figures

PATENTED SEP 25 1973　　3,761,804

LOW SATURATION POLE PIECE FOR A MAGNETIC THICKNESS GAUGE

The invention relates to magnetic measuring instruments for the measurement of the thickness of nonmagnetic layers on a ferromagnetic base or of the thickness of magnetic layers possibly on nonmagnetic bases.

Magnetic micrometers for layers have been constructed to operate in accordance with the following principles:

a. Utilization of the adhesive attractive force of a magnet in contact with the layer that is to be measured, b. Utilization of the influence on a steady magnetic field by the layer, c. Utilization of the influence on an alternating magnetic field by the layer.

In all cases, the layer that is to be measured is contacted with one or two measuring pole pieces consisting of ferromagnetic raw material and, generally speaking, having a region in the shape of a hemisphere to be placed in contact with the surface to be measured. These measuring pole pieces in example a) above, consist of the raw material for a permanent magnet or of soft iron, and in examples b) and c) always of soft iron. By "raw material for permanent magnets" is meant a raw material with a high coercivity field strength $H_c$ greater than 100 Oersted and with relatively high magnetic saturation; by "soft iron" is meant a raw material with a low coercivity field strength but with high magnetic saturation of 18,000 to 21,400 Gauss.

Micrometers with measuring pole pieces made of these raw materials are disadvantageous in that upon constriction of the magnetic lines of force at the point of contact with the layer to be measured, the measurement is strongly influenced by the momentary condition of the layer at the point of contact:

Small elevations, or indentations, at this point simulate strongly scattered local values of measurement which, however, are not significant for the determination of the thickness of the layer as a whole. Also, the calibration curve (deflection in accordance with the thickness of the layer) in the beginning of the measuring range, and in the case of thin layers on a magnetic base, progresses too steeply, and in the case of thicker layers, it is too flat.

The invention avoids these disadvantages of the known micrometers for measuring the thickness of layers. It consists in that in the case of magnetic micrometers, the portion of the measuring pole piece, or poles, adajcent the point of contact, consists of a soft magnetic raw material that has a low magnetic saturation of less than 14,000 Gauss.

As a result of the low magnetic saturation of the adjacent region of the measuring pole piece, the constriction of the magnetic lines of flow at the point of contact with the measured layer will be decreased, and as a result of that, a more even slope of the calibration scale will be utilized. Another advantage is that with this, a wider range of measurements will be made possible from the start, beginning with zero thickness, and increasing to greater thicknesses of layers. Furthermore, the use, according to the invention, of measuring pole pieces with low magnetic saturation will permit, in the case of measurements of nonmagnetic layers on a ferromagnetic base, the carrying out of this measurement on considerably thinner bases, even in the case where, because of a strong contraction of the magnetic lines of force due to the saturation of the base, no measurements were previously possible at all.

According to the invention, it is advantageous if the raw material of the measuring pole pieces has a coercivity field strength of less than 3 Oersted, preferably less than 1 Oersted, as well as a mechanical hardness of more than $H_{R_c} = 20$, assuring a high resistance against abrasion.

A raw material that, according to the invention, is used advantageously for measuring pole pieces of micrometers consists of an alloy of Fe with 13 to 18 percent Al, preferably Fe with about 16 percent Al and it has a magnetic saturation of 4,000 to 10,000 Gauss and a coercivity field strength of less than 1 Oersted. At the same time, and in order to increase the hardness, the Al may be replaced, up to 8 percent by Si. Small additions not substantially influencing the above mentioned characteristics of the alloy of other elements naturally are possible.

Measuring pole pieces, according to the invention, with a low magnetic saturation, are useful in the case of the three previously mentioned measuring processes.

Figure 1:
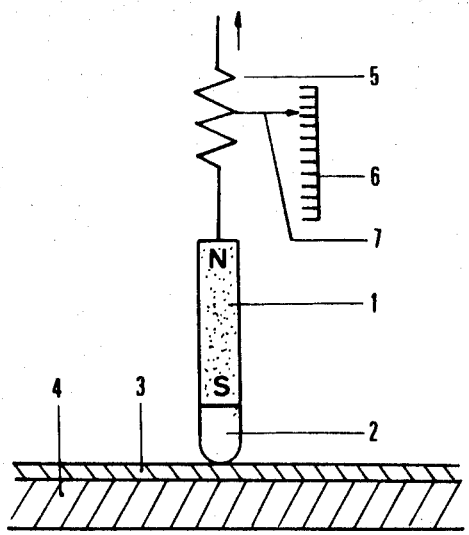
FIG. 1 is a diagrammatic view in elevation of a preferred form of magnetic micrometer, in accordance with the invention.

In FIG. 1, a micrometer is shown according to the adhesion principle, in which a permanent magnet pole piece 1 is provided with an end portion 2 with low magnetic saturation, which is urged, by means of spring 5, away from the nonmagnetic layer 3 that lies on the ferromagnetic base 4. The maximal force required to pull the magnet out of contact with layer 3 is read from scale 6 by means of pointer 7, and provides a value corresponding to the thickness of layer 3.

Figure 2:
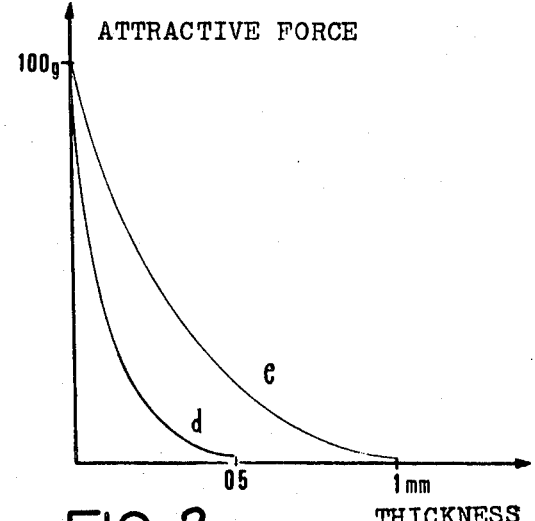
FIG. 2 is a diagram of a relationship between the attractive force of the magnet and the thickness of the measured layer.

The shape of the force curves is shown in FIG. 2, in which the attractive force of the magnet is plotted vertically, and the thickness of the layer is plotted horizontally. In the case of a pole piece with a high magnetic saturation of about 20,000 Gauss, curve $d$ will be obtained, while in the case of a pole piece with a magnetic saturation of approximately 8,000 Gauss curve $e$ will be obtained, which, in the beginning, is flatter and extends over a wider area. It may be noted that the magnetization of the permanent magnet 1 has been adjusted to such a value, that the attractive force of 100 grams was obtained for a zero thickness of the layer in both cases.

Figure 3:
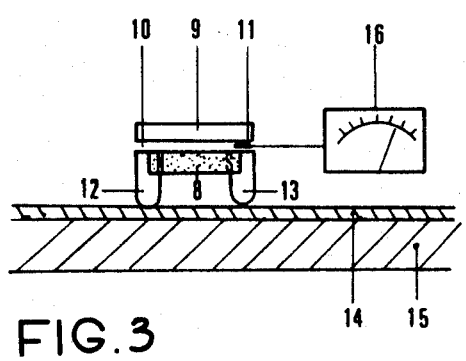
FIG. 3 is a diagrammatic view in elevation of a magnetic micrometer utilizing a permanent magnet field; and, FIG. 4 is a schematic diagram of a circuit using an alternating magnetic field.

FIG. 3 shows a micrometer in which a steady magnetic field is influenced by the thickness of a layer. The magnetic field of permanent magnet 8 proceeds partly through the magnetic shunt 9 through the air gap 10 in which there is positioned a semiconductor, for example, a Hall probe 11, that is sensitive to the strength of the magnetic field, and partly through the measuring pole pieces 12 and 13 and through the nonmagnetic layer 14, which is to be measured, toward the magnetic base 15. The magnetic field strength in the air gap of the shunt will influence the Hall probe 11, whose Hall voltage is measured by instrument 16. In this case, too, the use of a raw material, according to the invention, in forming the contacting portions of measuring pole pieces 12 and 13 in a manner similar to magnet 1, will result in an improved shape of the curve resulting when the values produced by meter 16 are plotted against the thicknesses measured, in a wider measuring range as well as the other previously mentioned advantages.

Figure 4:
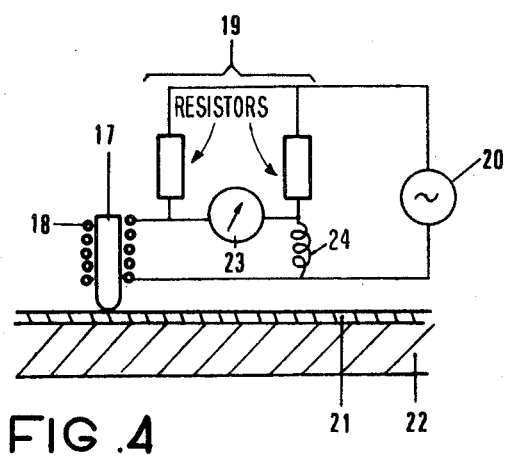

Even in the case of micrometers with an alternating magnetic field, the raw materials, according to the invention, still can be used. A diagram of such a measuring instrument is shown in FIG. 4.

A winding 18, cooperating with a measuring pole piece 17, made of a raw material according to the invention, forms a branch in electrical bridge circuit 19, and is supplied with alternating voltage by generator 20. If the bridge circuit, including the winding 18 and pole piece 17, is first calibrated to obtain a reading on the scale of instrument 23, or if the bridge is balanced to obtain a zero flow of current, with the pole piece 17 isolated from outside magnetic influences, there will be a mistuning of the bridge circuit 19 when the pole piece 17 is placed in contact with the surface 21, depending on the thickness of layer 21 on the fer-romagnetic base 22, so that values of the thickness of the layer can be read according to calibration of changes in values recorded by instrument 23.

In this case, as well as in connection with the system of FIG. 3, the thickness can be plotted against the readings obtained from meters 16 or 23, respectively, in which the voltages will correspond to the vertical axis in the curve of FIG. 2. In each case, when the pole piece approaches a magnetic material, there will be a disproportionate increase in the slope of the curve in the case of prior art pole pieces.

In the case of measuring with an alternating magnetic field, it will be particularly advantageous that the alloys, according to the invention, also have a low electric conductivity together with low magnetic saturation. This is the case, for example, with the above mentioned Fe alloy with Al and/or Si, according to the invention. With reference to low electric conductivity, the ferrites are still lower, since they also have a low magnetic saturation that likewise is suited particularly for constituting the contact regions of measuring poles of micrometers according to the invention.

What is claimed is:

1. In a magnetic micrometer of the type wherein a permanent magnet body is employed to contact a surface whose thickness is to be measured, the improvement comprising said magnet body having a first body portion comprising ferromagnetic material having high magnetic saturation greater than 18,000 Gauss and a second polar ferromagnetic portion to be positioned in contact with said surface to be measured having a magnetic saturation of less than 14,000 Gauss, an exterior portion of the surface of said second polar portion being generally convex to provide a substantially point contact with the surface to be measured.

2. In the invention defined in claim 1, wherein said second portion has a coercivity field strength of less than 3 Oersted.

3. In the invention defined in claim 1, whrein said second portion has a coercivity field strength of less than 1 Oersted.

4. In the invention defined in claim 1, wherein the material comprising said second portion possesses a hardness rating on the Rockwell scale of more than 20.

5. In the invention defined in claim 1, wherein said second portion consists of an alloy of iron, with about 13 to 18 percent aluminum.

6. In the invention defined in claim 1, wherein said second portion consists of an alloy of iron, with about 16 percent aluminum having a magnetic saturation in the range of between 5,000 to 10,000 Gauss and a coercivity field strength of less than 1 Oersted.

7. In the invention defined in claim 1, wherein said second portion consists of an alloy of iron, with up to 8 percent silicon.

8. In the invention defined in claim 1, wherein said second portion consists of an alloy of iron, with up to 8 percent silicon, having a magnetic saturation in the range of between 5,000 to 10,000 Gauss and a coercivity field strength of less than 1 Oersted.

9. In the invention defined in claim 1, wherein said second portion consists of a ferrite material.

10. In the invention defined in claim 1, wherein said second portion consists of a ferrite material having a coercivity field strength of less than 3 Oersted.

11. In the invention defined in claim 1, wherein said second portion consists of a ferrite material having a coercivity field strength of less than 1 Oersted.

12. In a magnetic micrometer of the type wherein one pole of an elongated permanent magnetic body is employed to contact a surface whose thick-ness is to be measured, the surface of that portion of the magnetic body which is to contact a surface to be measured being generally convex to provide a substantially point contact, the improvement comprising said magnet body consisting of a ferromagnetic material having a magnetic saturation of less than 14,000 Gauss.

13. In the invention defined in claim 12, wherein said magnetic body has a coercivity field strength of less than 3 Oersted.

14. In the invention defined in claim 12, wherein said magnetic body has a coercivity field strength of less than 1 Oersted.

15. In the invention defined in claim 12, wherein the material comprising said magnetic body possesses a hardness rating on the Rockwell scale of more than 20.

16. In the invention defined in claim 12, wherein said magnetic body consists of an alloy of iron, with about 13 to 18 percent aluminum.

17. In the invention defined in claim 12, wherein said magnetic body consists of an alloy of iron, with about 16 percent aluminum having a magnetic saturation in the range of between 5,000 to 10,000 Gauss and a coercivity field strength of less than 1 Oersted.

18. In the invention defined in claim 12, wherein said magnetic body consists of an alloy of iron, with up to 8 percent silicon.

19. In the invention defined in claim 12, wherein said magnetic body consists of an alloy of iron, with up to 8 percent silicon, having a magnetic saturation in the range of between 5,000 to 10,000 Gauss and a coercivity field strength of less than 1 Oersted.

20. In the invention defined in claim 12, wherein said magnetic body consists of a ferrite material.

21. In the invention defined in claim 12, wherein said magnetic body consists of a ferrite material having a coercivity field strength of less than 3 Oersted.

22. In the invention defined in claim 12, wherein said magnetic body consists of a ferrite material having a coercivity field strength of less than 1 Oersted.

23. In a thickness measuring instrument of the type wherein the indication of the thickness of a layer applied to a ferromagnetic surface is a function of the magnetic flux passing between a soft magnetic pole piece in contact with the exposed surface of said applied layer and said surface, comprising a pole piece provided with a surface for substantially point contact with said layer to be measured, circuit means including a source of alternating current and means to magnetically energize said pole piece, said circuit means also including instrument means to indicate variations in an electrical value of said circuit means cause by variations in said magnetic flux, said pole piece comprising a magnetic material having a magnetic saturation of less than 14,000 Gauss, a hardness rating on the Rockwell scale of more than 20, and low electrical conductivity.

24. The invention defined in claim 23, wherein said pole piece is elongated, and provided with a convex surface at one end for contact with said exposed surface.

25. The invention defined in claim 23, wherein said means to indicate variations in an electrical value of said circuit means comprises an electrical bridge circuit, said means to magnetically energize said pole piece being connected in one leg of said bridge circuit, said instrument means being connected in another leg of said bridge circuit.

26. The invention defined in claim 25, wherein said pole piece is elongated, and said circuit means includes an electrical winding surrounding a portion of said pole piece.

* * * * *